(12) United States Patent
Banerjee et al.

(10) Patent No.: US 7,284,148 B2
(45) Date of Patent: Oct. 16, 2007

(54) METHOD AND SYSTEM FOR SELF-HEALING IN ROUTERS

(75) Inventors: Dwip Banerjee, Austin, TX (US); Kumar Ravi, Cedar Park, TX (US); Eduardo Spring, Round Rock, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 10/870,528

(22) Filed: Jun. 17, 2004

(65) Prior Publication Data

US 2005/0283643 A1 Dec. 22, 2005

(51) Int. Cl.
*G06F 11/00* (2006.01)

(52) U.S. Cl. .............................. 714/4; 714/43; 370/248; 370/228

(58) Field of Classification Search .................... 714/4
See application file for complete search history.

(56) References Cited

U.S. PATENT DOCUMENTS

| | | | |
|---|---|---|---|
| 5,872,919 A | | 2/1999 | Wakeland |
| 5,918,017 A | | 6/1999 | Attanasio et al. |
| 6,122,514 A | | 9/2000 | Spaur et al. |
| 6,515,967 B1 | * | 2/2003 | Wei et al. ................... 370/244 |
| 6,530,032 B1 | | 3/2003 | Shew et al. |
| 6,535,489 B1 | | 3/2003 | Merchant et al. |
| 6,545,981 B1 | * | 4/2003 | Garcia et al. ............... 370/242 |
| 6,910,148 B1 | * | 6/2005 | Ho et al. ...................... 714/4 |
| 2003/0056138 A1 | | 3/2003 | Ren |
| 2003/0128662 A1 | | 7/2003 | Lee et al. |
| 2004/0107382 A1 | * | 6/2004 | Doverspike et al. .......... 714/4 |
| 2004/0139179 A1 | * | 7/2004 | Beyda ........................ 709/221 |
| 2005/0283639 A1 | * | 12/2005 | Le Pennec et al. ............ 714/4 |

OTHER PUBLICATIONS

IBM TDB Jul. 1993 v36 n07 pp. 113-116: "Router Automatic Link Re-Establishment Process".
"Fault-tolerant hierarchical routing"-Alari, G.; Datta, A.; Derby, J.; Lawrence, J.; IEEE Intl. Performance, Computing & Communications Conf., 1997, Feb. 1997, pp. 159-161.
Dossier SVL920010085: "Protocol to fix broken links on the world wide web".

* cited by examiner

*Primary Examiner*—Yolanda L Wilson
(74) *Attorney, Agent, or Firm*—Marilyn S. Dawkins; Dillon & Yudell LLP

(57) ABSTRACT

A method and system for self-healing of routers within a distributed computer network. In response to a detected communication error at a local router over a primary communication path to a distant router, an alternate path is established. Thereafter, a diagnostic process is initiated in the distant router via the alternate path. Communication settings are then reconfigured in the distant router and communication via the primary communication path is tested. If communication is restored, the new communication settings are made permanent. If communications via the primary path are not restored, alternate communication settings are attempted in the local router and communication is tested again. If communication is re-established via the primary path, the new communication settings are made permanent.

14 Claims, 2 Drawing Sheets

METHOD AND SYSTEM FOR SELF-HEALING IN ROUTERS

BACKGROUND OF THE INVENTION

1. Technical Field

The present invention relates in general to improved network communications and in particular, to an improved method for restoring communication errors within computer networks. Still more particularly, the present invention relates to methods and systems for self-healing of communication errors in a computer network.

2. Description of the Related Art

Communication via widespread computer networks has become a fact of modern life. The Internet, a wide area network which connects thousands of disparate networks, spans various industries, educational institutions, government agencies and research facilities. Smaller networks, spanning individual organizations, are also quite common.

Communication in such networks is typically controlled utilizing specialized computer equipment known as "routers" which act as a gateway for routing data between separate networks which utilize a specific adapter. Communication between various routers typically takes place over a specified "link" and is governed by various communication parameter settings including link speed and link parameters, such as: data compression protocols; flow control and congestion control parameters; low level communication protocols such as PPP versus frame-relay; and link management protocols which may be provided within certain protocols.

Errors in communication between two routers can be so-called "hard errors" where there is no link between the two routers, or "soft errors" where some types of mismatch occurs between two routers over an existing link.

Various techniques have been proposed for correction of communication errors between routers in a computer network. For example, Wakeland, U.S. Pat. No. 5,872,919 teaches a specialized packet processor which can be selectively re-configured so that the processor can dispatch and recognize differing communication protocols. However, existing routers without such a specialized packet processor often cannot recover from communication errors.

Ren, U.S. Published Patent Application U.S. 2003/0056138 A1 teaches a method and system for providing automated redundant paths where, upon a processor failure, communication may be switched to a redundant, albeit less efficient pathway.

Attanasio et al., U.S. Pat. No. 5,918,017 solves this problem by providing clusters of gateway devices which can be re-aligned in the event of a communication failure.

Other similar systems have been proposed, which also establish alternate communication paths or utilize specialized equipment to re-establish communication between two routers in the event of a communication failure. Each such system either solves the problem by establishing an alternate path, or by utilizing specialized redundant and/or intelligent equipment.

It should therefore be evident that a method and system are needed which can automatically restore communications errors over an existing communication link.

SUMMARY OF THE INVENTION

It is therefore an object of the present invention to provide an improved network communication system.

It is another object of the present invention to provide an improved method for correcting communication errors within computer networks.

It is yet another object of the present of the invention to provide an improved method and system for self-healing of communication errors in a computer network.

The foregoing objects are achieved as is now described. A method and system are provided for self-healing of routers within a distributed computer network. In response to a detected communication error at a local router over a primary communication path to a distant router, an alternate path is established. Thereafter, a diagnostic process is initiated in the distant router via the alternate path. Communication settings are then reconfigured in the distant router and communication via the primary communication path is tested. If communication is restored, the new communication settings are made permanent. If communications via the primary path are not restored, alternate communication settings are attempted in the local router and communication is tested again. If communication is re-established, the new communication settings in the local router are then made permanent.

BRIEF DESCRIPTION OF THE DRAWINGS

The novel features believed characteristics of the invention are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF THE PREFERRED EMBODIMENT

Figure 1:
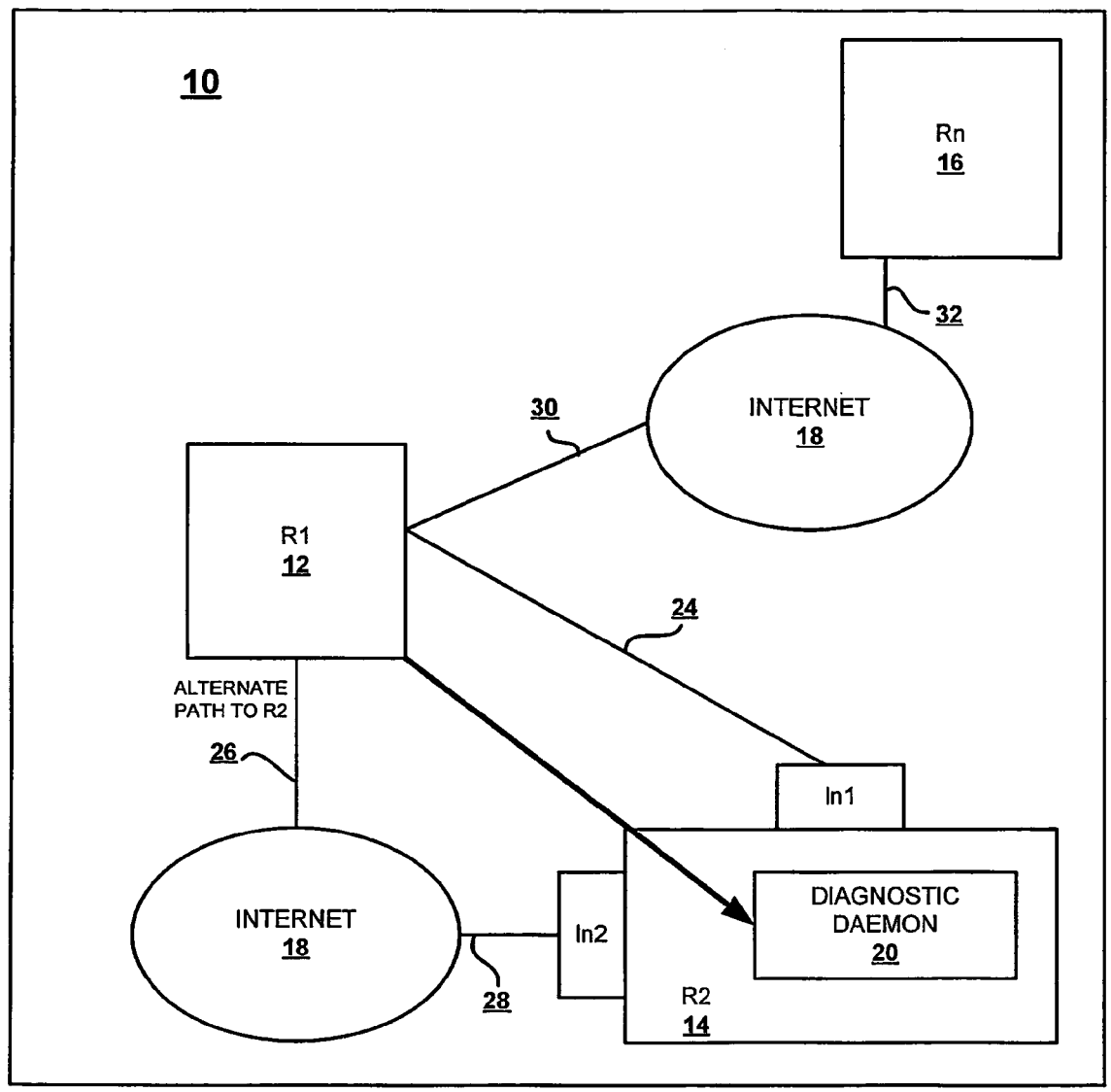
FIG. 1 is a high-level schematic illustration of a wide area communication network which may be utilized to implement the method and system of the present invention.

With reference now to figures in particular with reference to FIG. 1, there is depicted a high-level schematic illustration of a wide area communication network 10, which may utilize the implemented method and system of the present invention. As illustrated, multiple routers are interconnected within network 10 via the Internet 18 or any other suitable wide area network. Thus, as illustrated, Router 1 may communicate with Router 2 via primary link 1$n$1, at reference numeral 24, or via an alternate path 1$n$2 via links 26 and 28. Similarly, additional routers (not all shown) such as Router Rn, as indicated at reference numeral 16, may also communicate within communications network 10.

Still referring to FIG. 1, as depicted within Router 2 at reference numeral 14; Router 2 includes a Diagnostic Daemon 20. Diagnostic Daemon 20 is a simple software process which will be described in greater detail herein and which may be added to any existing router in accordance with the process described in the high-level logic flowchart contained herein.

Figure 2:
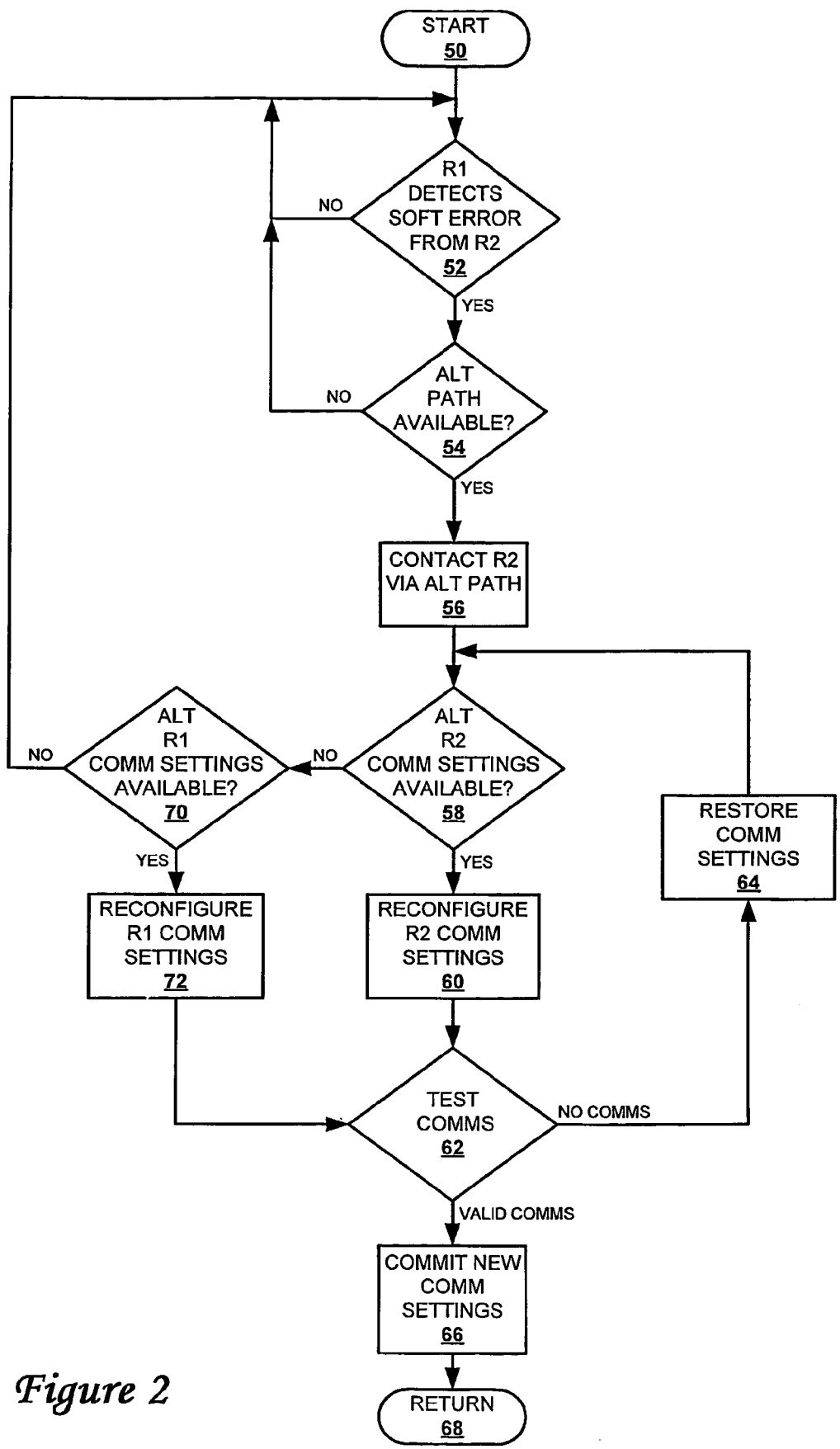
FIG. 2 is a high-level logic flowchart illustrating a method of implementing the method and system of the present invention.

Referring now to FIG. 2, there is depicted a high-level logic flowchart which illustrates a process for implementing the method and system of the present invention. As depicted, this process begins at Block 50 and thereafter passes to Block 52. Block 52 illustrates a determination of whether or not a communications "soft error" has been detected at Router 1, with respect to communication with Router 2 (see FIG. 1). If not, the process merely iterates until such time as such an error has been detected.

Still referring to Block 52, in the event a communications "soft error" has been detected, the process passes to Block 54. Block 54 illustrates a determination of whether or not an alternate path between Routers R1 and R2 is available. And if not, the process again returns to Block 52, in an iterative fashion, to await detection of a subsequent error.

Still referring to Block 54, in the event an alternate path between Routers R1 and R2 is available, the process passes to Block 56 which depicts contacting Router R2 via the alternate path. Next, the process passes to Block 58. Block 58 depicts a determination whether or not alternate communication settings are available for Router R2 and if so, the process passes to Block 60.

Block 60 illustrates the reconfiguration of at least one communication setting for Router R2 and thereafter, the process passes to Block 62. Block 62 illustrates a testing of communication between Router R2 and all other routers with which Router R2 has previously had communication. Communication with all other routers must be checked to ensure that changes to communication settings do not disrupt other communication channels. In the event the communication test is not successful, the process passes to Block 64. Block 64 illustrates the restoration of the original communication settings and thereafter, in an iterative fashion, the process passes to Block 58 to determine whether or not a subsequent alternate communication setting for Router R2 is available. In the event a subsequent alternate communication setting is available, that configuration setting is attempted and the process passes to Block 60 and repeats, as described above.

Still referring to Block 58, in the event no alternate communication settings are available for Router R2, or all possible communication settings for Router R2 have been attempted unsuccessfully, the process passes to Block 70. Block 70 illustrates a determination of whether or not alternate communication settings are available for Router R1, and if not, the process returns to Block 52 in an iterative fashion to await detection of a subsequent error.

However, still referring to Block 70, in the event alternate communication settings are available for Router R1, the process passes to Block 72. Block 72 illustrates the reconfiguration of a communication setting for Router R1 and thereafter, as described above, the process passes to Block 62. Block 62 illustrates the testing of communications with all routers previously in communication with Router R1 and if that test is unsuccessful, the process passes once again to Block 64. Block 64, as described above, illustrates the restoration of the previous communication settings and the process then passes back through Block 58 and once again to Block 70 assuming that all alternate communication settings for Router R2 have been tested.

Referring to again to Block 62, in the event variation of communication settings in either Router R2 or Router R1 has resulted in valid communications, the process passes to Block 66, which depicts a commitment to the new communication settings for and the process then passes to Block 68 and returns.

Upon reference to the foregoing, those skilled in the art will appreciate that the method and system of the present invention provides a simple yet efficient technique whereby soft communication errors between two routers may be automatically cured by the simple expedient of contacting the router for which the communication has failed via an alternate path and thereafter, altering various communication parameters and testing communication until communication has been restored. Thereafter, the alternate communication parameters are made permanent. In this manner, communication between two routers over a primary communication may be restored without requiring extended communication over an alternate path and without requiring intelligent switching equipment or redundant equipment at each router location.

While the invention has been particularly shown and described with reference to a preferred embodiment, it will be understood by those skilled in the art that various changes in form and detail may be made therein without departing from the spirit and scope of the invention.

What is claimed is:

1. A method for self-healing of routers within a distributed network, said method comprising the steps of:

establishing an alternate path through said distributed network from a local router to a specified router in response to a detection of recoverable communication errors through a primary path from said specified router;

initiating a diagnostic process within said specified router via said alternate path;

reconfiguring communication settings of said specified router utilizing said diagnostic process;

thereafter, testing communication with said specified router over said primary path; and committing to said reconfigured communication settings in response to a successful communication test wherein communication with said specified router via said primary path is restored.

2. The method for self-healing of routers within a distributed network according to claim 1, further including the step of testing communication between said specified router and all other routers previously communicating with said specified router within said distributed network.

3. The method for self-healing of routers within a distributed network according to claim 1, further including the step of restoring all original communication settings in response to an unsuccessful communication test.

4. The method for self-healing of routers within a distributed network according to claim 1, wherein said step of reconfiguring communication settings of said specified router utilizing said diagnostic process comprises a step of reconfiguring a communication speed of said specified router.

5. The method for self-healing of routers within a distributed network according to claim 1, wherein said step of reconfiguring a duplex state of said specified router.

6. The method for self-healing of routers within a distributed network according to claim 1, further the step of reconfiguring communication settings of said local router in response to an unsuccessful communication test.

7. The method for self-healing of routers within a distributed network according to claim 6, further including the step of:

thereafter, retesting communication with said specified router via said primary path.

8. A router system for self-healing of routers within a distributed network, said system comprising:

a memory;

diagnostic means stored in said memory within a router for establishing an alternate path through said distributed network from a local router to a specified router in response to a detection of recoverable communication errors through a primary path from said specified router;

said memory further comprising:
  means for initiating a diagnostic process within said specified router via said alternate path;
  means for reconfiguring communication settings of said specified router utilizing said diagnostic process;
  means for thereafter testing communication with said specified router over said primary path;
  means for committing to said reconfigured communication settings in response to a successful communication test wherein communication with said specified router via said primary path is restored.

9. The router system for self-healing of routers within a distributed network according to claim 8 further including means for testing communication between said specified router and all other routers previously communicating with said specified router within said distributed network.

10. The router system for self-healing of routers within a distributed network according to claim 8, further including means for restoring all original communications settings in response to an unsuccessful communication test.

11. The router system for self-healing of routers within a distributed network according to claim 8, wherein said means for reconfiguring communication settings of said specified router comprises means for reconfiguring a communication speed of said specified router.

12. The router system of self-healing of routers within a distributed network according to claim 8, wherein said means for reconfiguring communication settings of said specified router comprises means for reconfiguring a duplex state of said specified router.

13. The router system of self-healing of routers within a distributed network according to claim 8, further including means for reconfiguring communication setting of said local router in response to an unsuccessful communication test.

14. The router system of self-healing of routers within a distributed network according to claim 13, further including means for retesting communication with said specified router via said primary path.

* * * * *